United States Patent [19]

Ishikawa

[11] 4,404,728
[45] Sep. 20, 1983

[54] TOOL POT CLEANING SYSTEM FOR TOOL MAGAZINE

[75] Inventor: Kazutomi Ishikawa, Okayama, Japan
[73] Assignee: Mori Machinery Co., Ltd., Okayama, Japan
[21] Appl. No.: 257,410
[22] Filed: Apr. 24, 1981
[30] Foreign Application Priority Data Apr. 26, 1980 [JP]  Japan ............................. 55-57902[U]

[51] Int. Cl.³ ............................................ B23Q 3/157
[52] U.S. Cl. ..................................... 29/568; 82/34 R; 407/11; 211/1.5; 15/405
[58] Field of Search .................... 82/34 R; 408/57, 59; 407/11; 29/568; 15/405; 211/1.5

[56] References Cited
U.S. PATENT DOCUMENTS 2,469,642  5/1949  Grewe .................................... 15/405
4,141,134  2/1979  Zettler et al. .......................... 29/568
4,164,879  8/1979  Martin .................................... 408/59

Primary Examiner—Robert E. Garrett
Assistant Examiner—Hien H. Phan
Attorney, Agent, or Firm—Koda and Androlia

[57] ABSTRACT

A tool pot cleaning system for use by installing in a tool magazine of an automatic tool exchanger in machine tool. The tool pot cleaning system, installed in a tool magazine, equipped with a number of tool pots supported radically with an angle of elevation along the outer circumference of said tool magazine, comprises an air connection port disposed at the inside of the tool cradle and an air passage formed in the base of the tool pot. When the tool pot is tilted for exchanging tools, the air passage is channeled through to the said air connection port and the air jets into the tool pot to perform the cleaning of the inside of the tool pot.

3 Claims, 6 Drawing Figures

TOOL POT CLEANING SYSTEM FOR TOOL MAGAZINE

BACKGROUND OF THE INVENTION

1. Field of the Invention

The present invention relates to a tool pot cleaning system for a tool magazine, and more particularly to a tool pot cleaning system installed in a tool magazine of an automatic tool exchanger (ATC) with a design to automatically perform the air jetting operation by means of the movement of the tool pot.

2. Description of the Prior Art

In the conventional ATC systems, there have been those equipped with special cleaners designed to jet the air from the outside of the tool pot, but it seems that no such types as to effect the operation for cleaning the inside of the tool pot by utilizing the movement of the tool pot itself have been offered. Recently, a compact spindle unit equipped with ATC system as shown in FIGS. 1 and 2, wherein a tool exchange arm 2 is provided on a spindle head 1, and on top of the latter, a tool magazine 3 is mounted, has been developed. However, this spindle unit equipped with ATC system is disadvantageous in that, because of the close location of the tool pot 4 of the tool magazine 3 to that of the spindle's tapered portion 5 for fitting tools, chips and waterdrops tend to reach down to the inside of the tool pot, and the inside of the tool pot is quite easily contaminated.

In the above conventional spindle unit, there can be seen a spindle head having an air passage therein through which air jet is provided to the tool pot formed at the tapered portion of the spindle head. However, an effective cleaning of the tool pot can not be done by the air jet where the ATC is provided near the spindle head, as shown in FIGS. 1 and 2. A tool, therefore, installed in the tool pot with remained chips results unsatisfactory working accuracy.

SUMMARY OF THE INVENTION

It is a principal object of this invention to provide a tool pot cleaning system for a tool magazine, wherein the surface of the tool pot is cleaned through automatically jetting the air from inside of the tool pot each time the tools are exchanged.

In keeping with the principles of the present invention, the object is accomplished by a unique cleaning system for the tool pot of a tool magazine which has the following structural features: an air connection port is provided in a tool cradle for tilting the tool pot supported on a slant with angle of elevation and thereto, a tool holder is fitted to the horizontal level at a position set for exchanging tools; also, an air passage is provided in the base of the tool pot; and when the tool pot is tilted onto the cradle, the air passage is channeled through, letting the air jet out from the air connection port for cleaning the inside of the tool pot.

BRIEF DESCRIPTION OF THE DRAWINGS

The above-mentioned features and objects of the present invention will become more apparent by reference to the following description taken in conjunction with the accompanying drawings, wherein like reference numbers denote like elements, and in which.

DETAILED DESCRIPTION OF THE INVENTION

Figure 1:
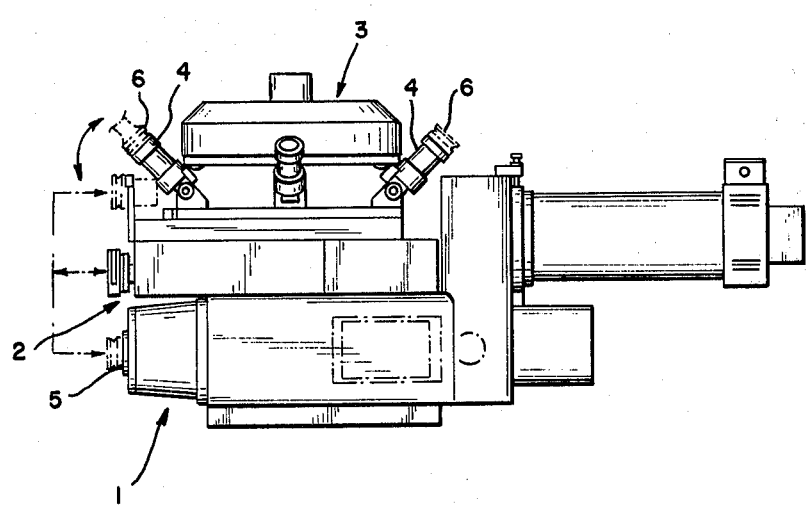
FIG. 1 is a side view showing a spindle unit including the ATC system for demonstrating an example of mounting of a system of this invention.
Figure 2:
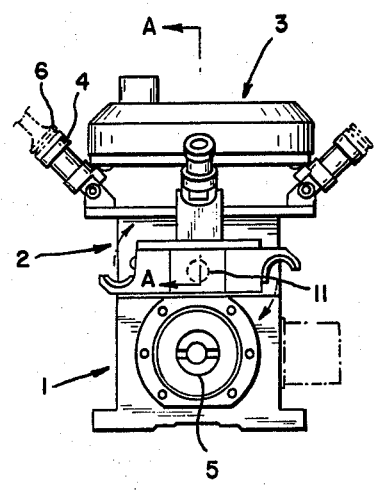
FIG. 2 shows a front view thereof.
Figure 3:
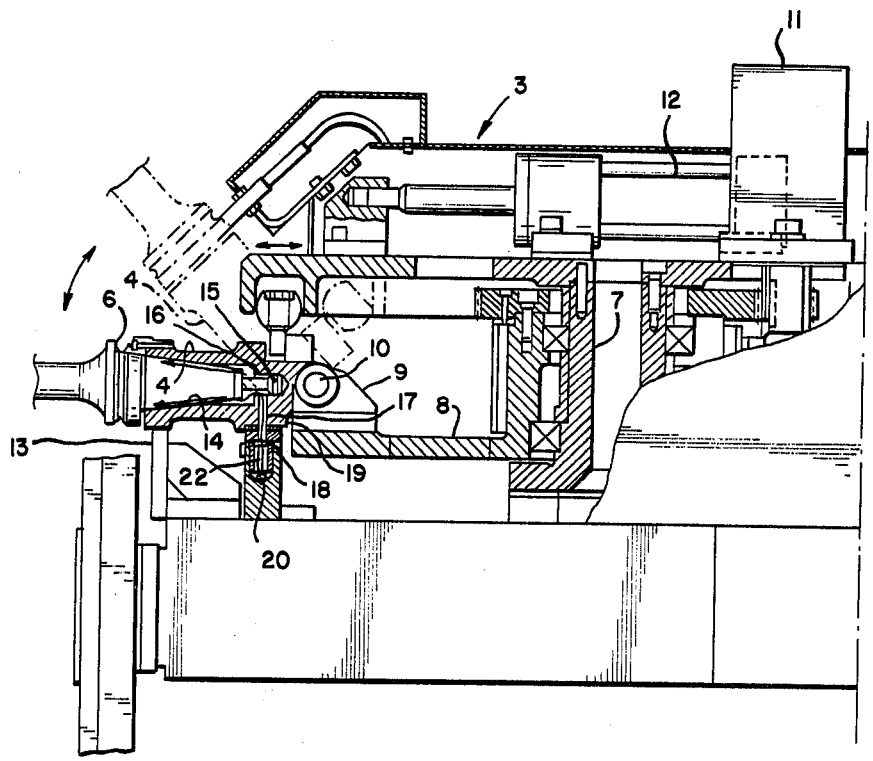
FIG. 3 is an enlarged sectional view taken partially along the line A—A shown in FIG. 2.
Figure 4:
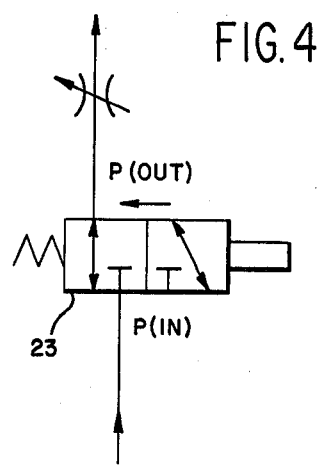
FIG. 4 is a schematic view showing an air piping system.

Detailed description will hereunder be given of the embodiment of the present invention with reference to the drawings. FIG. 3 is the enlarged sectional view of the portion marked with A—A line in FIG. 2, showing the essential area of this invention. Referring to the FIGS., the tool magazine 3 comprises: a number of tool pots 4 which rotate in a tilting position with an elevation angle, from the horizontal position marked with a solid line to the position marked with a two-dot chain line in the FIG. by means of a pin 10 of a bracket 9 provided on the outer circumference of a tool pot supporting disc 8 which rotates centering around a center shaft 7; a tool pot selecting motor 11 installed on the center shaft 7; and a tool pot rotating cylinder 12. In this embodiment, the tool cradle 13 is a frame for setting the position of the tool pot for exchanging the tools, and in this portion, the pot cleaning system using the air, is disposed. The tool pot 4 is provided with a tapered hole 14 into which the tapered tool holder 6 is inserted, and also with an encasing hole 16, disposed at a further inner location beyond the said tapered hole 14, for housing a release guard projection 15, provided for the use in case of mounting on the spindle. From the inside of the said encasing hole, the air passage 17 is formed towards the flank of the pot (the lower side in the FIG.) with perforation opened to the outside. The pot side of the lower end of the air passage is made to be a pressuring surface 19 of the air connection port 18, and it is designed so that when the air connection port 18 is pressed down, the air is jetted into the pot from an air port 20. The connection port 18 moves up and down by means of a built-in spring 22 in a manner to be pressed to the air passage 17. Therefore, when the tool pot 4 is tilted down from the position indicated with the two-dot chain line to the horizontal position marked with a solid line in the FIG., the air passage 17 is connected and opened through to the connection port 18, and through an exchange signal effected by the aforesaid mechanism. The air comes through to the tapered hole 14 from the air port 20 by opening the air valve 23 as shown in FIG. 4, to clean the inside of the tool pot 4.

Figure 5:
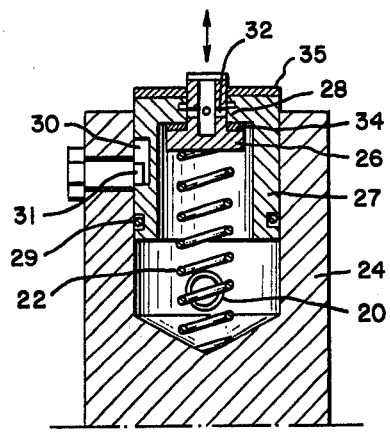
FIGS. 5 and 6 are sectional views of a mechanical valve.
Figure 6:
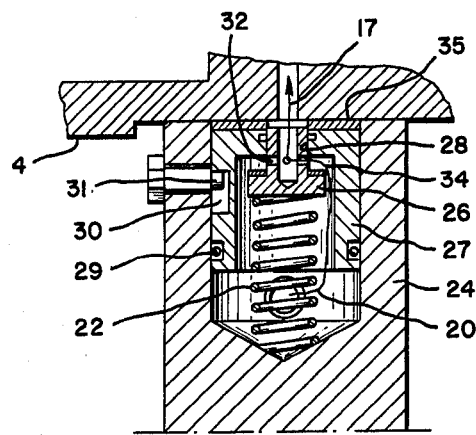

FIGS. 5 and 6 show an example of the mechanical valve used for the tool pot cleaner. FIG. 5 shows the closed state, and FIG. 6 shows the opened state. By the use of this mechanical valve, the foregoing valve 23 and its operation circuit can be unnecessitated. The mechanical valve is constructed as follows: the air port 20 is disposed at the location nearby the bottom of a valve body 24, closing the lower portion; while the cup-shape ram 27 provided with a valve 26 insertion hole 28 in its upper portion, is inserted into the valve body 24; and the airtight condition is maintained with the seal 29; also, the lengthwise range for vertical movement is regulated by a positioning pin 31, which is inserted into a long hole 30, provided in the flank; furthermore, valve 26, with the upside-down T-shape section, as well as the air way 32 provided in its side, is inserted into the said insertion hole 28 and supported by the pressure spring 22 in a manner to be pressed from below. Designated at 34 and 35, are the packing materials.

The cup-shape ram 27 and the valve 26 are usually kept pressed by the pressure spring 22, to be in contact with each other and to move up to the point of contacting with the positioning pin 31, thus, closing the air way 32 as shown in FIG. 5. However, when the tool pot 4 in FIG. 3 lowers its position by rotational movement and comes into contact with the surface of the packing material 35, located on the upper surface of the valve, thus, pressing down the valve 26, then the cup-shape ram 27, and thereby changing the state to that shown in FIG. 6. The air way 32 is then opened and channeled through to the air passage 17 of the tool pot 4, letting the air jet into the tapered hole 14 of the tool pot 4 from the air port 20 to perform the cleaning by blowing out the chips and waterdrops which stick to it. In this case, the maximum cleaning effect is obtained at the moment when the tapered portion of the tool holder 6 is just about to come into contact with the tapered hole 14, with only a small gap left between them.

In the above-mentioned operation, the air jetting motion is continued throughout the following steps: to change the position of the tool pot supported with an elevation angle to the tool exchange position, by rotating it to the horizontal level; to remove the tool holder 6; to insert the next exchanged tool holder into the tool pot; and again, to return the tool pot to the position having maintained the original angle of elevation. Consequently, the inside of the tool pot is always maintained clean. Furthermore, because the operation is carried out automatically by the movement of the tool pot itself, it is also advantageous in that no other driving source is required.

The foregoing description is for the horizontal spindle, but the art of the above-mentioned embodiment can be commonly used, regardless of the angle of the spindle, whether it is vertical, horizontal, or oblique.

What is claimed is:

1. A tool pot cleaner of a tool magazine which is on a cradle provided with a number of tool pots, attachment means for pivotally mounting a tool pot to said cradle, the tool pots being disposed movably and radially with an elevation angle of the outer circumference of said tool magazine, said tool pot cleaner comprising:
   an air passage provided at the base of each tool pot; and
   an air supply means having an air connection port provided in the tool cradle for supplying air to said air passage via said air connection port when said tool pot is tilted for tool exchange;
   whereby when the tool pot is tilted for tool exchange, the air passage is opened through to said air connection port to thereby let the air jet into the tool pot to clean the inside of the tool pot.

2. A tool pot cleaner according to claim 1, wherein the air jets into the tool pot when an air valve of the air supply means is opened by receiving an exchange signal to supply air to said air passage via said air connection port.

3. A tool pot cleaner according to claim 1, wherein the air supplying means comprises a mechanical valve which comprises:
   a valve body provided in said tool cradle;
   an air port disposed at a location nearby the bottom of said valve body;
   a cup-shape ram provided with a valve insertion hole in its upper portion inserted into the valve body;
   a valve with an upside-down T-shape cross-section slidably provided in said insertion hole with a top portion engagable with said tool pot;
   a pressure spring provided in said valve body and biasing said cup-shape ram and valve such that said cup-shape ram and valve extend above said tool cradle; and
   an air way provided in said valve and in alignment with said air passage in said tool pot when tool pot engages with said top of said valve.

* * * * *